(12) United States Patent
Watanabe et al.

(10) Patent No.: US 6,850,757 B2
(45) Date of Patent: Feb. 1, 2005

(54) MAIL NOTIFICATION APPARATUS AND A MAIL NOTIFICATION METHOD

(75) Inventors: Shinichi Watanabe, Tokyo (JP); Toshio Nagatsuka, Tokyo (JP)

(73) Assignee: Panasonic Communications Co., Ltd., Tokyo (JP)

( * ) Notice: Subject to any disclaimer, the term of this patent is extended or adjusted under 35 U.S.C. 154(b) by 535 days.

(21) Appl. No.: 09/836,270

(22) Filed: Apr. 18, 2001

(65) Prior Publication Data

US 2001/0034226 A1 Oct. 25, 2001

(30) Foreign Application Priority Data

Apr. 20, 2000 (JP) .................................... 2000-119628

(51) Int. Cl.[7] ...................... H04M 11/10; H04M 11/00; G06F 15/16
(52) U.S. Cl. ............................. 455/412.2; 455/412.1; 455/414.1; 455/422.1; 709/206; 709/213; 709/217; 709/219; 379/88.13; 379/93.24
(58) Field of Search .......................... 455/412.1, 412.2, 455/413, 422.1, 414.1; 709/206, 213, 217, 219; 379/88.13, 88.14, 93.01, 93.24

(56) References Cited

U.S. PATENT DOCUMENTS

| 5,604,788 | A | * | 2/1997 | Tett .......................... 455/412.1 |
| 5,956,521 | A | * | 9/1999 | Wang ............................ 710/35 |
| 6,219,694 | B1 | * | 4/2001 | Lazaridis et al. ........... 709/206 |
| 6,393,463 | B1 | * | 5/2002 | Fuchigami ................... 709/206 |
| 6,630,883 | B1 | * | 10/2003 | Amin et al. ................. 455/466 |
| 2001/0034225 | A1 | * | 10/2001 | Gupte et al. ................. 455/412 |
| 2002/0159575 | A1 | * | 10/2002 | Skladman et al. ........ 379/93.24 |

FOREIGN PATENT DOCUMENTS

| JP | 10013460 | 1/1998 | ........... H04L/12/54 |
| JP | 10313338 | 11/1998 | ........... H04L/12/54 |
| JP | 11272582 | 10/1999 | ........... G06F/13/00 |
| JP | 11316762 | 11/1999 | ........... G06F/17/30 |
| JP | 2001237874 | 8/2001 | ........... H04L/12/54 |

OTHER PUBLICATIONS

U.S. Appl. No. 09/099,528 to Saito et al., filed on Jun. 18, 1998.*
U.S. Appl. No. 09/158,579 to Shimoosawa et al., filed on Sep. 22, 1998.*
U.S. Appl. No. 09/832,107 to Miyanaga, filed on Apr. 11, 2001.*
English Language Abstract of JP 11–272582.
English Language Abstract of JP 2001–237874.
English Language Abstract of JP 11–316762.
English Language Abstract of JP 10–313338.
English Language Abstract of JP 10–13460.
Ohkubo, Masahiki "A way of using a mail in the cellular phone age" Unix User, Japan Soft Publishing Corporation, Jun. 1, 1999, vol. 8, sixth issue, pp. 27–38, along with a translation.

* cited by examiner

*Primary Examiner*—Fan Tsang
*Assistant Examiner*—Ovidio Escalante
(74) *Attorney, Agent, or Firm*—Greenblum & Bernstein, P.L.C.

(57) ABSTRACT

A mail notification apparatus is provided that enables a user of a cellular phone to know of the arrival of an electronic mail, even when the user is away from his/her office. The mail notification apparatus stores an electronic mail address of a local mail account in association with a mail address of a cellular phone. When it is determined that the electronic mail has arrived at the electronic mail address, the mail notification apparatus notifies, by using electronic mail, the arrival of the electronic mail to the cellular phone through the Internet and a communication vender mail server.

7 Claims, 4 Drawing Sheets

Fig. 3

| | Local Mail Account | Password | Cellular Phone Mail Address |
|---|---|---|---|
| 301a | Taro.Matsushita | TMATSU | 09001234567@xxx.co.jp |
| | Jiro.Matsushita | JMATSU | 09012345678@xxx.co.jp |
| 301b | Saburo.Matsushita | SMATSU | 09023456789@xxx.co.jp |
| | Sirou.Matsushita | SIMATSU | 09034567890@xxx.co.jp |
| | | | |

301 302 303 303b

MAIL NOTIFICATION APPARATUS AND A MAIL NOTIFICATION METHOD

BACKGROUND OF THE INVENTION

1. Field of the Invention

This invention relates to a mail notification apparatus and method that notifies the arrival of an electronic mail.

2. Description of Related Art

Due to the recent spread of the Internet, information communication is commonly used between remote computers. For example, an electronic mail is used as a means of information communication between personal computers (hereinafter, referred as to "PC").

Generally, when an electronic mail is used, a user subscribes to a provider, and sends an electronic mail to a mail server maintained by the provider. The provider transfers the electronic mail to a mail server corresponding to an addressee (destination). Thus, an electronic mail is transmitted to a desired addressee (destination). On the other hand, when the user wants to confirm the arrival of an electronic mail, the user should start a PC, and so on, connect to the provider, and retrieve an electronic mail stored in the mail server of the provider, to confirm the arrival of the electronic mail.

However, the above-described procedure to confirm the arrival of the electronic mail require starting of PC, and so on, and connection to the provider before confirming presence of arrived (received) electronic mails. Accordingly, the user should stand by a place where PCs, and so on, are present. However, even when the user is going out, or away from his/her office/home, electronic mails arrive in many circumstances. In such a case, the user may only have a communication apparatus, such as a cellular phone, with him/her. Thus, it is difficult to obtain information regarding the arrival of an electronic mail at the mail server maintained by the provider.

Accordingly, the present invention is provided in view of the above-described problem, and an objective of the present invention is to provide a mail notification apparatus and method that provides a superior convenience to let a user know of (confirm) the arrival of electronic mails even when the user is away.

SUMMARY OF THE INVENTION

To achieve the above and/or other goals, the present invention provides a mail notification apparatus and method in which a mail address of a cellular phone is stored in a memory section, in association with a predetermined electronic mail address. It is determined whether an electronic mail arrives at the predetermined electronic mail address. When it is determined that the electronic mail has arrived, the arrival of the electronic mail is notified to the mail address of the cellular phone by using electronic mail.

According to the construction as described above, even when a user of the predetermined electronic mail address is away from his/her office, when an electronic mail has arrived at the predetermined mail address, the arrival of the electronic mail is notified to the cellular phone. Accordingly, the user can know of the arrival of the electronic mail at the predetermined electronic mail address, even when he/she is away from his/her office.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 shows a mail address conversion table stored in the HD section of the mail notification apparatus according to the embodiment of the present invention.

DETAILED DESCRIPTION OF THE PREFERRED EMBODIMENTS

The embodiments of the present invention are explained in the following with reference to drawings.

Figure 1:
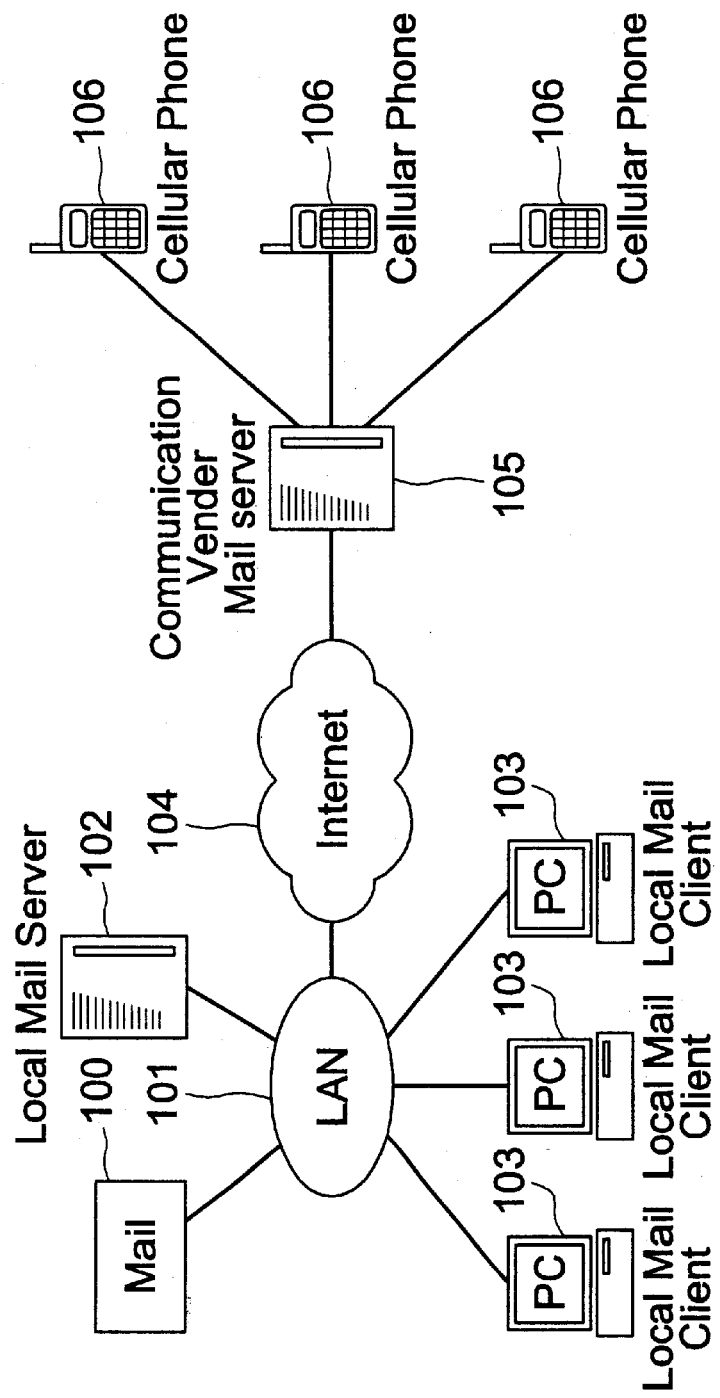
FIG. 1 is a schematic view illustrating a network on which a mail notification apparatus according to an embodiment of the present invention operates.

FIG. 1 is a schematic view illustrating a network on which a mail notification apparatus 100 operates, according to an embodiment of the present invention.

As shown in FIG. 1, the mail notification apparatus 100 of the present invention is, for example, provided on a LAN 101 built in a company. A local mail server 102 and local mail clients 103, each of which is embodied, for example, as a PC, and so on, are connected to the LAN 101. The mail notification apparatus 100 is further connected to the Internet 104 via the LAN 101. Thus, the mail notification apparatus 100 of the present invention is capable of accessing a mail server 105 of a communication vender (hereinafter "communication vender mail server").

The local mail server 102 receives an electronic mail from the Internet 104 via the LAN 101. Then, the local mail server 102 stores the received electronic mail into a mailbox corresponding to a mail address of the electronic mail. The local mail client 103 accesses the local mail server 102, at a predetermined time or in response to a predetermined instruction. When an electronic mail is stored in a corresponding mailbox, the local mail client 103 retrieves the electronic mail. Thus, the local mail client 103 can receives an electronic mail from the Internet 104.

On the other hand, the communication vender mail server 105 performs wireless communication of electronic mail data with a cellular phone 106 according to a communication protocol specialized for the communication vender. Thus, the cellular phone 106 can transmits/receives an electronic mail to/from the Internet 104.

In the network as described above, the mail notification apparatus 100 notifies the cellular phone 106 of the arrival of the electronic mail stored in the mailbox of the local mail server 102. Hereinafter, the electronic mail to notify the arrival of an electronic mail is called an "arrival notification mail". The configuration (construction) and the control of the mail notification apparatus 100 is explained below.

Figure 2:
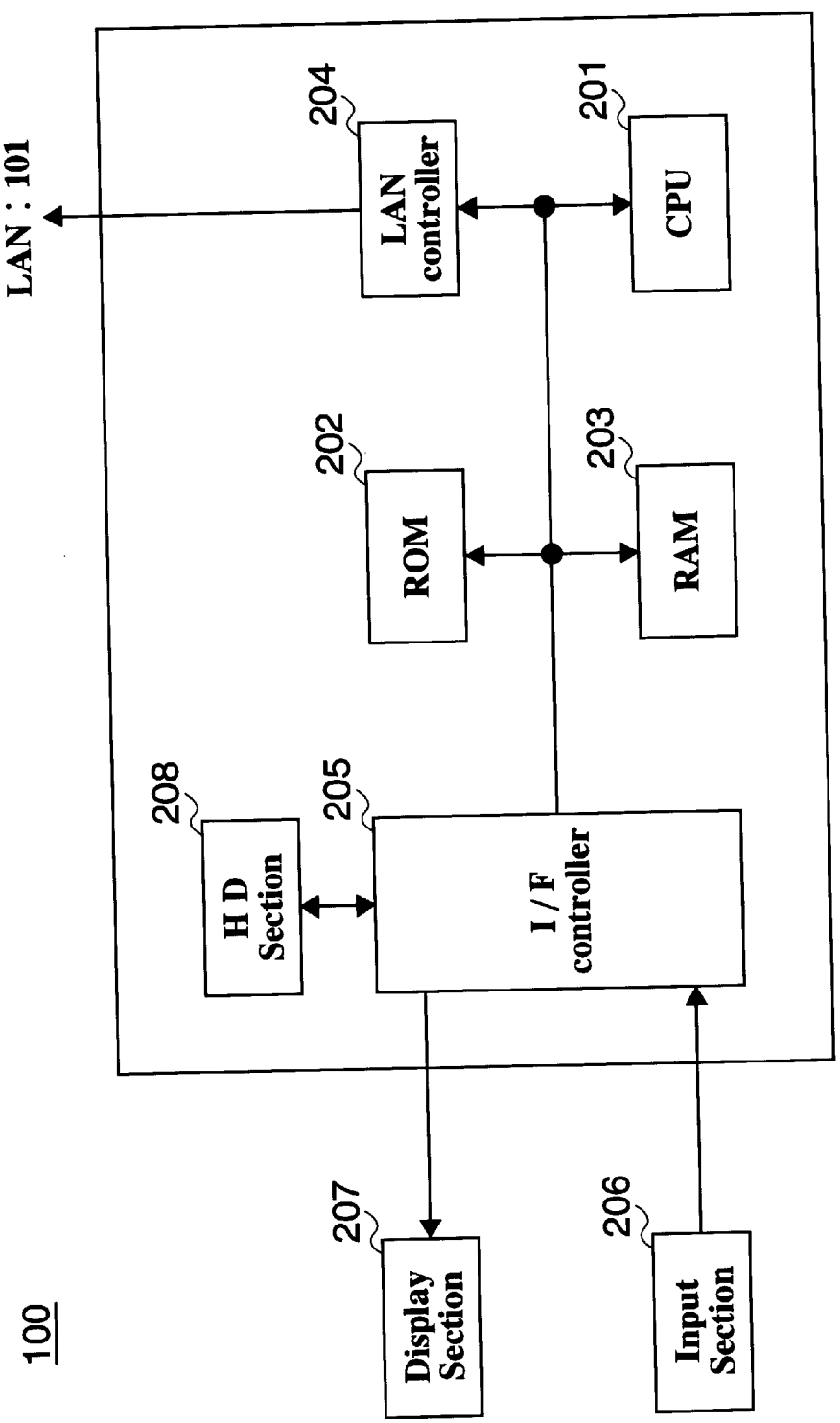
FIG. 2 is a block diagram illustrating hardware of the mail notification apparatus according to the embodiment of the present invention.

FIG. 2 is a block diagram illustrating hardware of the mail notification apparatus 100.

In FIG. 2, a CPU (Central Processing Unit) 201 performs a process according to a program. A ROM (read only memory) 202 is a read only memory that stores an execution program to transmit and receive an electronic mail, an address conversion program to notify the arrival of an electronic mail, which is described later, and an execution program to transmit an arrival notification mail, which is also described later. A RAM (Random Access Memory) 203 is a main memory in which the CPU 201 loads a program and data to execute. A LAN controller 204 performs a process required to transmit/receive data to/from the LAN 101. Since the CPU 201 performs an execution program to transmit and receive an electronic mail, which is stored in the ROM 202, the mail notification apparatus 100 achieves transmission and reception of an electronic mail through the LAN controller 204 and LAN 101.

An I/F controller 205 is connected to an input section 206, such as a keyboard, and a display section 207, such as a CRT display or a LCD display, both of which are provided outside of the apparatus. Further, the I/F controller 205 is connected to a hard disk section (hereinafter "HD section"), which is provided inside of the apparatus. Thus, the I/F controller 205 controls data transmission among these sections.

The input section 206 is used when a user inputs a predetermined command or data, and so on, into the mail notification apparatus 100. The display section 207 is used to display a current status of the print notification apparatus 100 or predetermined data.

The HD section 208 stores data mainly used for controlling the mail notification apparatus 100. In particular, the HD section 208 stores a mail address conversion table 300, as shown in FIG. 3

As shown in FIG. 3, the mail address conversion table 300 stores a local mail account 301 and a password 302, which are used as an identification code when the local mail client 103 retrieves an electronic mail from a mailbox in the local mail server 102. In addition, the mail address conversion table further stores a mail address 303 of the cellular phone 106 (hereinafter "cellular phone mail address") in association with the local mail account 301 and the password 302. The stored local mail account 301, password 302 and the cellular phone mail address 303 can be updated.

Figure 4:
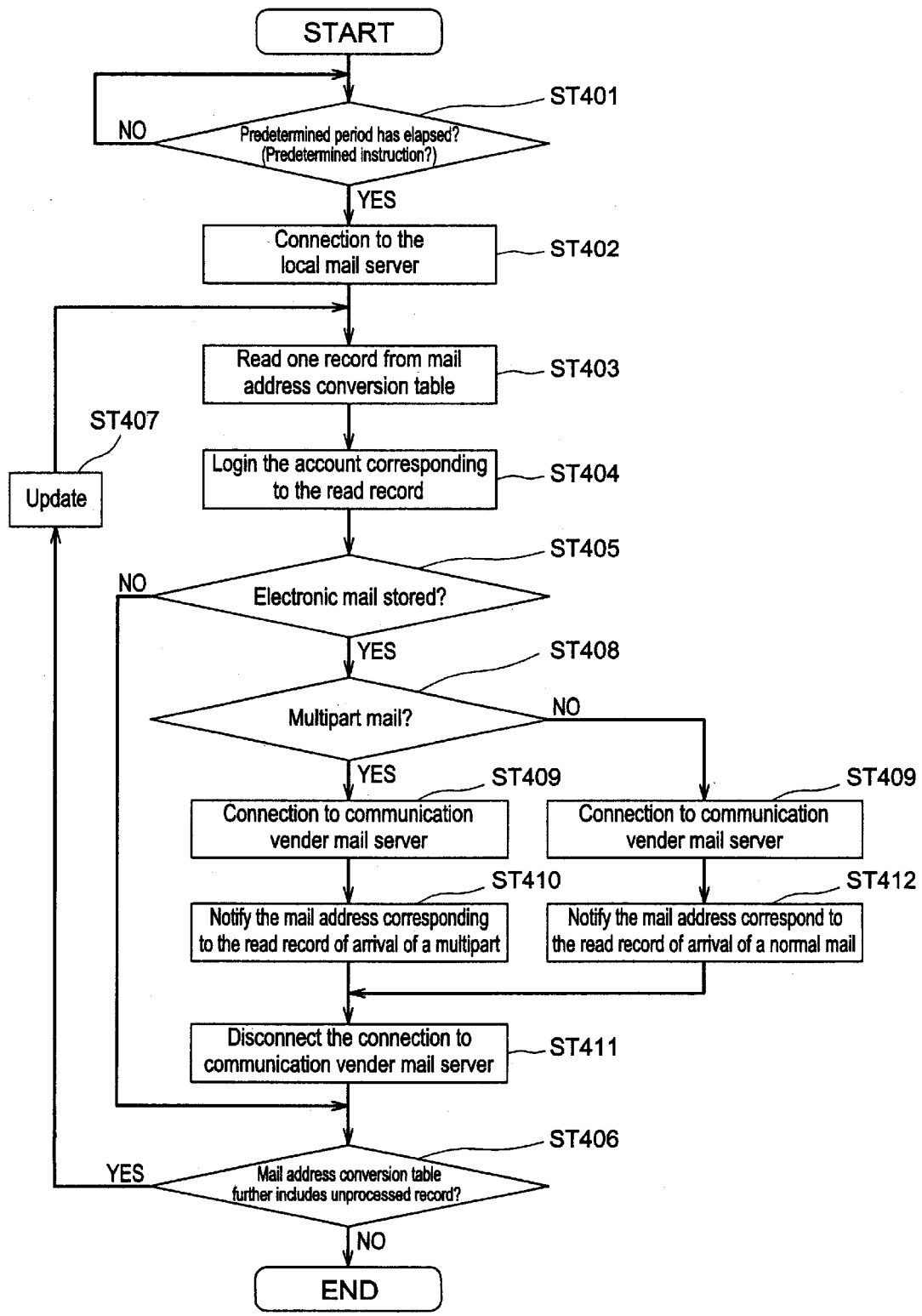
FIG. 4 is a flowchart illustrating an operation when the mail notification apparatus notifies a cellular phone of the arrival of an electronic mail, according to the embodiment of the present invention.

Next, an operation in which the mail notification apparatus 100 having the above-described configuration transmits an arrival notification mail to the cellular phone 106 is explained with reference to FIG. 4.

To make the mail notification apparatus 100 transmit the arrival notification mail, presetting is required. In other words, when a user of the local mail client 103 is going out, the user is required to set the mail notification apparatus 100 to request for transmitting the arrival notification mail to the cellular phone 106. To set the request for transmitting the arrival notification mail, flags are provided in the HD section 208, for example. By checking the value of the flags, the mail notification apparatus 100 can know of who needs transmission of mail notification mail. Although it is not shown in FIG. 3, the flags can be included in the mail address conversion table 300.

In this embodiment, it is assumed that "Taro.Matsushita" 301a and "Saburo.Matsushita" 301b, listed in the local mail account 301 shown in FIG. 3, are set to request for transmitting the arrival notification mail. In other words, it is set that, when these two users having the above-designated two local mail accounts 301 (301a, 301b) are away from their offices, the arrival of the electronic mails is notified to their own cellular phone 106.

As described above, if the transmission of the arrival notification mail is set, the mail notification apparatus 100 monitors whether a predetermined period has elapsed. When the predetermined period has elapsed (ST401), the mail notification apparatus 100 establishes a connection to the local mail server 102 (ST402). It is assumed that an IP address of the local mail server 102 is previously set to the mail notification apparatus 100.

Note that, although in this embodiment, the connection to the local mail server 102 is established by checking (or monitoring) a lapse of a predetermined period, it is also possible, as an alternative, to establish the connection to the local mail server 102, when the user inputs a predetermined instruction (or command) into the mail notification apparatus 100.

When a connection to the local mail server 102 is established, the mail notification apparatus 100 reads one record of mail account data from the mail address conversion table 300 stored in the HD section 208 (ST403).

At this time, the mail notification apparatus 100 reads a record of mail account data for which transmission of an arrival notification mail is requested. Accordingly, from all mail account data stored in the mail address conversion table 300, only records corresponding to the mail account data that requests transmission of an arrival notification mail, are read. Thus, the time required for the process for transmission of the arrival notification mails can be reduced. In this embodiment, the mail account data of "Taro.Matsushita" 301a is read first.

Then, the mail notification apparatus 100 logs in the account corresponding to the read record (ST404). At this time, the mail notification apparatus 100 logs onto the account by using a local mail account and a password read from the mail address conversion table 301. In this embodiment, the mail notification apparatus 100 firstly logs onto the account of "Taro.Matsushita" 301a.

Upon logging onto the account, the mail notification apparatus 100 sends a query to the local mail server 102, and determines whether the mailbox corresponding to the account stores an electronic mail, in particular, a newly arrived (received) electronic mail, based on the response to the query from the local mail server 102 (ST405). In other words, the mail notification apparatus 100 determines whether the mailbox corresponding to "Taro.Matsushita" 301 stores an electronic mail.

In this embodiment, it is assumed that the mailbox corresponding to "Taro.Matsushita" 301a stores no electronic mail, and that the mailbox corresponding to "Saburo.Matsushita" 301b stores an electronic mail.

Here, since the account, i.e., the mailbox corresponding to "Taro.Matsushita" 301a stores no electronic mail, the mail notification apparatus 100 determines whether there is other mail account data for which transmission of the arrival notification mail is requested, in the mail address conversion table 300 (ST406).

In this embodiment, since there is "Saburo.Matsushita" 301b for which transmission of the arrival notification mail is set, the mail notification apparatus 100 updates the mail account data to be read (ST407), and reads another one record of the mail account data from the mail address conversion table 300 (ST403).

In other words, the mail notification apparatus 100 reads the mail account data of "Saburo.Matsushita" 301b. Then, as described above, the mail notification apparatus 100 logs onto the account of "Saburo.Matsushita" 301b (ST404), and determines whether the mailbox corresponding to "Saburo.Matsushita" 301b stores an electronic mail (ST405).

Here, since the mailbox corresponding to "Saburo.Matsushita" 301b stores an electronic mail, the mail notification apparatus 100 determines whether the arrived (received)

electronic mail is a multipart mail (ST408). More specifically, the mail notification apparatus 100 reads a header of the arrived electronic mail, and determines whether there is an attachment file. In this embodiment, it is assumed that the electronic mail has an attachment file, i.e. is a multipart mail.

After determining whether the arrived (received) electronic mail is a multipart mail, the mail notification apparatus 100 establishes a connection to the communication vender mail server 105 through the LAN 101 and the Internet 104 (ST409). Here, it is assumed that the IP address of the communication vender mail server 105 is preset to the mail notification apparatus 100.

Since the arrived (received) electronic mail is a multipart mail, the mail notification apparatus 100 transmits an arrival notification mail for the multipart mail to the cellular phone mail address 303 in the mail account data currently being read (ST410). In other words, the mail notification apparatus 100 notifies, by using electronic mail, the cellular phone mail address 303 in the mail account data currently being read, of the arrival of an electronic mail and the fact that the electronic mail is a multipart mail.

More specifically, the mail notification apparatus 100 sends a predetermined (standard) message with a fixed form to the cellular phone mail address 303*b* "09023456789@xxx.co.jp", corresponding to "Saburo.Matsushita" 301*b*, to notify the arrival of an electronic mail and the fact that the electronic mail is a multipart mail. The standard message include a couple of short sentences, such as "An electronic mail has arrived. The arrived electronic mail is a multipart mail. The cellular phone 106 displays the message on a display portion, such as a LCD display, and so on.

Accordingly, the user of the cellular phone 106 can know that an electronic mail has arrived at the mail address corresponding to the local mail client 103, even when he/she is away from his/her office. Accordingly, the user of the cellular phone 106 can take some necessary actions, for example, can read the arrived (received) electronic mail at a PC in the place away from his/her office.

After the arrival of the electronic mail and the fact that the electronic mail is a multipart mail are notified to the corresponding cellular phone mail address 303*b* by using electronic mail, the mail notification apparatus 100 disconnects the connection to the communication vender mail server 105 (ST411).

Then, the mail notification apparatus 100 determines again whether the mail address conversion table 300 includes other mail account data for which transmission of the arrival notification mail is requested (ST406). When there is other mail account data for which the transmission of the arrival notification mail is requested, as described above, the process of ST407 is preformed, and then the control is returned to ST403 so as to repeat the process from ST403 to ST411. On the other hand, when there is no electronic mail data for which transmission of the arrival notification mail is requested, the mail notification apparatus 100 terminates the process.

In this embodiment, since there are only two mail accounts, i.e. "Taro.Matsushita" 301*a* and "Saburo.Matsushita" 302*b*, for which transmission of the arrival notification mail is requested, it is determined in ST406 that there is no more mail account data for which transmission of the arrival notification mail is requested. Accordingly, the mail notification apparatus 100 terminates the process.

Then, after the predetermined period has elapsed, the mail notification apparatus 100 starts the process starting from ST401.

When, in ST 408, the arrived electronic mail is determined as a normal electronic mail, i.e., an electronic mail without an attachment file, similar to the case where the arrived electronic mail is a multipart mail, the mail notification apparatus 100 establishes a connection to the communication vender mail server 105 through the LAN 101 and the Internet 104 (ST 409). Then, the mail notification apparatus 100 transmits an arrival notification mail indicating the arrival of a normal electronic mail, to the cellular phone mail address 303 in the mail account data currently being read (ST412). In other words, the mail notification apparatus 100 notifies, by using electronic mail, the cellular phone mail address 303 in the mail account data currently being read, of the arrival of an electronic mail. To notify the arrival of the electronic mail by using electronic mail, an electronic mail including a predetermined standard message with a fixed form is sent, as described above.

Further, when the arrival of the electronic mail is notified by using electronic mail in ST412, it is possible to check the contents of the body text of the arrived electronic mail, and, when the contents of the body text of the arrived electronic mail includes characters less than a predetermined number, to transmit the contents of the body text of the electronic mail. In this modification, the user of the cellular phone 106 can check the contents of the electronic mail. Accordingly, the user of the cellular phone 106 can determine whether the electronic mail should be read. Thus, it is possible to avoid reading unnecessary electronic mails. Further, in this case, it is more effective when the number of characters in this case is set the number of characters that is simultaneously displayable on the display portion of the cellular phone 106, since the contents of the body text of the electronic mail are prevented from being interrupted.

Further, when the user can read an electronic mail through the display portion of the cellular phone 106, the read electronic mail might be deleted from the local mail server 102. In other words, if the user can read (confirm) the contents of the electronic mail through the cellular phone, by deleting the electronic mail from the mailbox in the local mail server 102, it is possible to prevent the user from retrieving the electronic mail at the local mail client 103 again. Further, in this modification, the number of electronic mail stored in the mailbox in the local mail server 102 can be reduced.

When the contents of the body text of the electronic mail has more than a predetermined number of characters, it is possible to extract only the characters equal to or less than the number that can be simultaneously displayed on the display portion of the cellular phone 106. Even in this modification, similar to the case that the contents of the body text of the electronic mail has characters less than the predetermined number, the user can know of the contents of the electronic mail to some extent. Accordingly, the user of the cellular phone 106 can check the contents of the electronic mail. Thus, the user can determine whether the electronic mail should be read, based on the contents of the electronic mail.

As described above, the mail notification apparatus 100 of this embodiment establishes a connection to the local mail server 102, and, when the mailbox corresponding to a predetermined local mail account 301 stores an electronic mail, the mail notification apparatus 100 notifies the cellular phone mail address 303 corresponding to the local mail account 301 of the arrival of the electronic mail. Thus, the user of the cellular phone 106 can know of the arrival of an electronic mail at the mail address corresponding to the local mail client 103. Accordingly, the user of the cellular phone 106 can take a certain action, for example, can read the arrived electronic mail at the PC even when away from his/her office.

Further, when a multipart mail has arrived at the mail address corresponding to the predetermined local mail account 301, the mail notification apparatus 100 of this embodiment notifies, by using electronic mail, the cellular phone mail address 303 corresponding to the predetermined local mail account 301, of the arrival of the electronic mail and the fact that the electronic mail is a multipart mail. Accordingly, the user of the cellular phone 106 can know of the fact that the electronic mail has an attachment file, as well as the arrival of the electronic mail. Thus, the user of the cellular phone 106 can take a certain action, for example, can read the electronic mail and the attachment file thereof at the PC even when away from his/her office.

Further, in the present embodiment, when a predetermined time period has elapsed and there is an arrived electronic mail in a predetermined electronic mail address, the mail notification apparatus 100 transmits an arrival notification mail to a cellular phone corresponding to the predetermined electronic mail address,. However, the mail notification apparatus 100 is not limited thereto. Rather, a notification mail indicating no arrival of electronic mail can be sent, when the predetermined time period has elapsed. In this modification, there is an effect that the user of the cellular phone 106 can detect whether the electronic mail has arrived within a predetermined time period.

In this embodiment, the mail notification apparatus 100 constructed independently on the LAN 101 is discussed. However, the function of the mail notification apparatus 100 can be implemented in the local mail server 102. According to this modification, the effect of the above-described mail notification apparatus 100 can be achieved with only the local mail server 102.

Further, in this embodiment, the case where the mail notification apparatus 100 is provided on the LAN 101 constructed in a company and an electronic mail arrived at (received by) a mail address corresponding to a local mail client 103 is processed, is discussed. However, as an alternative, an Internet service provider can have the mail notification apparatus 100 and connect to the local mail server 103.

Further, when the Internet service provider has the mail notification apparatus 100, it is possible to notify the arrival of an electronic mail in an mail address corresponding to a subscriber client who establishes dial-up connection, to the cellular phone 106 owned by the user (subscriber client), in addition to establishing a connection to the local mail server 103 as in the embodiment described above. According to this modification, the user can establish a dial-up connection from a PC, and so on, to retrieve an electronic mail, only when the arrival of the electronic mail is notified to the cellular phone 106. Accordingly, the communication fee required for the dial-up connection can be reduced.

As described above, according to the present invention, it is determined whether an electronic mail has arrived at an local mail account. When an electronic mail has arrived, the arrival of the electronic mail is notified to the cellular phone mail address corresponding to the local mail account by using electronic mail. Accordingly, the arrival of the electronic mail can be known to a user even when he/she stays away from his/her office.

It is noted that the foregoing examples have been provided merely for the purpose of explanation and are in no way to be construed as limiting of the present invention.

While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-119628, filed on Apr. 20, 2000, which is herein expressly incorporated by reference in its entirety.

What is claimed is:

1. A mail notification apparatus comprising:
   a LAN controller configured to connect to a local mail client and to a local mail server via a LAN, and to connect to a cellular phone via an Internet, the local mail server receiving an e-mail directed to the local mail client via the LAN and storing the e-mail directed to the local mail client;
   a memory configured to store a mail address of the cellular phone associated with a local mail account of the local mail client;
   a controller configured to access the local mail server via the LAN, to check for an arrival of the e-mail directed to the local mail client by logging onto the local mail account of the local mail client, to search the memory for the mail address of the cellular phone associated with the local mail client to which the e-mail is to be sent when the e-mail directed to the local mail client is stored in the local mail server, to generate a notification message notifying a user of the associated cellular phone of the arrival of the e-mail directed to the local mail client, and to transmit the notification message to the associated cellular phone via the Internet.

2. The mail notification apparatus according to claim 1, wherein the controller transmits an e-mail message together with the notification message to the associated cellular phone.

3. The mail notification apparatus according to claim 2, wherein, when a number of characters of the e-mail message is less than a predetermined number, the controller transmits the e-mail message to the associated cellular phone, and when a number of characters of the e-mail message is more than the predetermined number, the controller transmits only the notification message to the associated cellular phone;
   the predetermined number of characters being a number of characters that can be simultaneously displayed on the display of the associated cellular phone.

4. The mail notification apparatus according to claim 2, wherein, when a number of characters of the e-mail message is more than the predetermined number, the controller transmit characters of the e-mail message not greater than the number of characters that can be simultaneously displayed on the display of the associated cellular phone.

5. The mail notification apparatus according to claim 1, wherein, when a document is attached to the e-mail, the controller transmits another notification message to the associated cellular phone, the another notification message notifying of the storage in the server of an e-mail directed to the local mail client and of the attachment of a document to the e-mail.

6. A server comprising:

a LAN controller configured to connect to a local mail client via a LAN and to a cellular phone via an Internet;

a first memory configured to store a mail address of the cellular phone associated with a local mail account of the local mail client;

a second memory configured to store a received e-mail directed to the local mail client; and a controller configured to check for an arrival of the e-mail directed to the local mail client by logging onto the local mail account of the local mail client, to search the first memory for the mail address of the cellular phone associated with the local mail client to which the e-mail is to be sent when the e-mail to the local mail client is stored in the second memory, to generate a notification message notifying a user of the associated cellular phone of the arrival of the e-mail directed to the local mail client, and to transmit the notification message to the associated cellular phone via the Internet.

7. A method of notifying an intended recipient of an arrival of an e-mail, a local mail client and to a local mail server via a LAN being connected, and the local mail server being connected to a cellular phone via an Internet, the local mail server receiving an e-mail directed to the local mail client via the LAN and storing the e-mail to the local mail client, a memory storing a mail address of the cellular phone associated with a local mail account of the local mail client, the method, comprising:

accessing the local mail server via the LAN;

checking for an arrival of the e-mail directed to the local mail client by logging onto the local mail account of the local mail client;

searching the memory for the mail address of the cellular phone associated with the local mail client to which the e-mail is to be sent when it is determined that the e-mail directed to the local mail client has arrived;

generating a notification message notifying a user of the associated cellular phone of the arrival of the e-mail directed to the local mail client, and transmitting the notification message to the associated cellular phone via the Internet.

* * * * *